United States Patent [19]

Yamaura et al.

[11] 4,347,581
[45] Aug. 31, 1982

[54] INPUT SETTING METHOD FOR DIGITAL OPERATIONAL DEVICES

[75] Inventors: Mitsuru Yamaura; Ryotaro Kondow, both of Fuchu; Megumu Mitani, Tama; Yoshiji Nii, Kawaguchi, all of Japan

[73] Assignee: Tokyo Shibaura Denki Kabushiki Kaisha, Kanagawa, Japan

[21] Appl. No.: 78,511

[22] Filed: Sep. 24, 1979

[51] Int. Cl.³ .............................................. G06F 7/04
[52] U.S. Cl. ...................................... 364/900; 371/71
[58] Field of Search ... 364/200 MS File, 900 MS File, 364/483; 371/4, 25, 36, 68, 71, 78

[56] References Cited

U.S. PATENT DOCUMENTS

| | | | |
|---|---|---|---|
| 3,049,692 | 8/1962 | Hunt | 371/71 |
| 3,460,094 | 8/1969 | Pryor | 364/900 |
| 3,503,047 | 3/1970 | Schaepman | 364/900 |
| 3,538,498 | 11/1970 | Games et al. | 371/68 |
| 3,601,804 | 8/1971 | Wainwright et al. | 371/68 |
| 3,693,163 | 9/1972 | Johnson et al. | 364/200 |
| 3,984,737 | 10/1976 | Okamura | 364/483 |
| 4,090,248 | 5/1978 | Swanson et al. | 364/900 |

FOREIGN PATENT DOCUMENTS 1265015  3/1972  United Kingdom ............... 371/71

OTHER PUBLICATIONS

*Memory Write Error Detection*, Sellers, Jr., IBM TDB, vol. 9, No. 6, Nov. 1966.

*Primary Examiner*—Harvey E. Springborn
*Attorney, Agent, or Firm*—Stevens, Davis, Miller & Mosher

[57] ABSTRACT

An input setting method for a protective relaying apparatus including an input setting switch for setting data, a digital operational device for carrying out a relaying operation utilizing the data, and a memory device for storing the data, the method comprising the steps of setting the data by the input setting switch, storing the data thus set in the memory device, comparing the set data with the stored data, carrying out the relaying operation utilizing the data when the compared data are found equal, and issuing an alarm signal when the compared data are found to be unequal.

4 Claims, 6 Drawing Figures

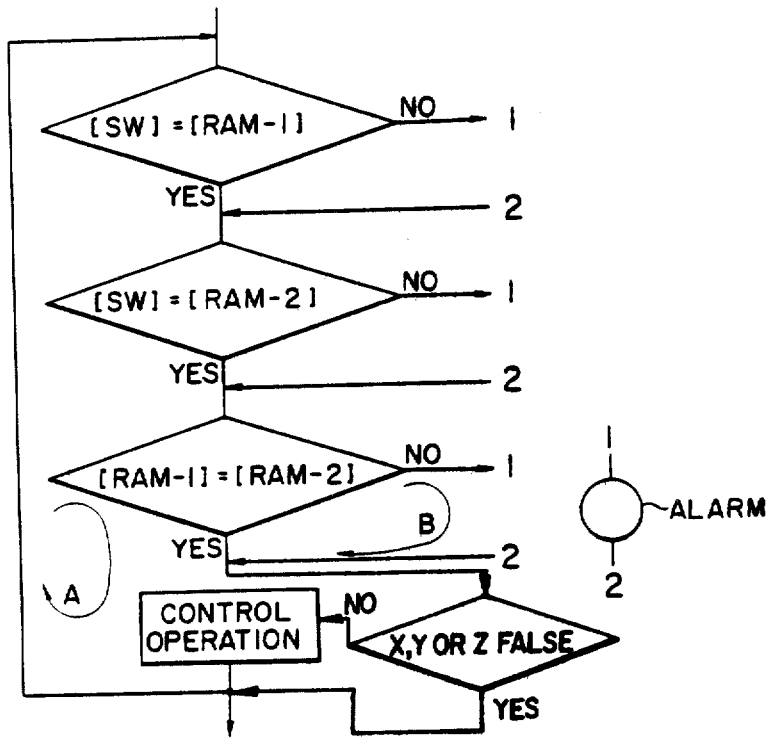

INPUT SETTING METHOD FOR DIGITAL OPERATIONAL DEVICES

BACKGROUND OF THE INVENTION

This invention relates to an input setting method for digital operational devices which method is adapted for use in process controls and system controls and more specifically for use in a controlled protective relaying apparatus for protecting an electric power transmission system.

Recently electronic computers have been widely used for process controls and system controls, and various modifications of minicomputers and microcomputers which are adapted for various applications have been proposed. Although these modified minicomputers and microcomputers may be called electronic computers, they are hereinafter termed "digital operational devices" because of their minor deviations from ordinary electronic computers.

In order to improve its reliability, each digital operational device is usually provided with a device for supervising the internal operation thereof. However, it is difficult to supervise the input setting operation of the digital operational device because the input setting values are varied unpredictably. thus, it is impossible to judge whether the input setting values (or data) are correct or not, and to detect an erroneous input when it occurs.

In the case where a digital control device is used with a relaying apparatus, as disclosed in U.S. Pat. No. 3,984,737, to protect an electric power transmission system, the adverse effects caused by the erroneous setting are serious, and in the worst case, the stability of the entire power transmission system will be lost.

SUMMARY OF THE INVENTION

A fundamental object of the present invention is to provide an input setting method for a digital operational device, particularly a protective relaying apparatus, which can improve the reliability of the input setting operation substantially.

Another object of the invention is to provide an improved input setting method for a digital operational device, particularly a protective relaying apparatus, wherein the reliability of the input setting operation can be improved by a periodic survey of the digital operation device.

According to the present invention, there is provided an input setting method for a digital operational device comprising setting data required in an operation of the digital operational device for controlling a system by at least one input setting switch, memorizing the data set by the input setting switch in at least one memory device under the control of the operational device, comparing the set data with the data memorized in the at least one memory device, and repeating the comparison operation during time intervals between the successive steps of the control operation.

In a specific embodiment of the present invention, the number of memory devices is selected to be two, and the comparison step compares the set data with each of the two data memorized in the two memory devices, and also compares the two data memorized in the two memory devices with the other.

In another embodiment of the invention, the number of memory devices is selected to be three, and the comparison step compares the set data with each of the three data memorized in the three memory devices.

In the still another embodiment of the invention, an alarm is activated to indicate the presence of an inequality between any pair of compared data.

In a further embodiment of the invention, the control operation of the digital operational device is locked when all of the results of comparisons are found unequal.

BRIEF DESCRIPTION OF THE DRAWINGS

In the accompanying drawings:

FIG. 4 is a flow chart for explaining the another embodiment of the invention;

FIG. 5 is a table showing the contents of three comparison steps in the embodiment shown in FIG. 4; and FIG. 6 is a table showing the contents of three comparison steps in still another embodiment of this invention.

DESCRIPTION OF THE PREFERRED EMBODIMENTS

Figure 1:
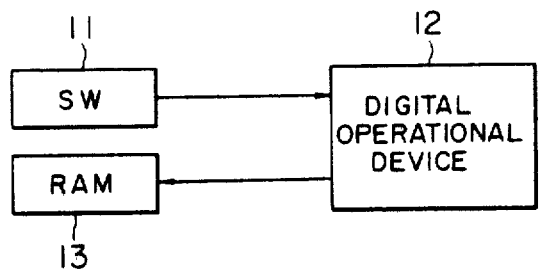
FIG. 1 is a block diagram used for carrying out an embodiment of the present invention.

In a block diagram shown in FIG. 1 used for carrying out a first embodiment of the present invention, a value introduced through an input setting switch 11 is memorized in a memory device 13 under the supervision of a digital operational device 12. The input setting switch 11 may actually comprise a required number of rotary switches, each having ten positions permitting the setting of any one of the digits 0 to 9. By rotating these rotary switches to required positions, any number having a required number of digits can be set.

The memory device 13 may be a RAM (random access memory) or the like which may be included in the digital operational device 12 or may be provided separately therefrom. The digital operational device 12 may be a minicomputer or a microcomputer of any suitable type adapted for the application as described hereinbefore. To clarify the description of the present invention, the value (data) thus set by the setting switch 11 is represented by [SW], and the value (data) memorized in the memory device 13 is represented by [RAM]. The memorization of the value (data) is performed under the supervision of the digital operational device 12.

Figure 2:
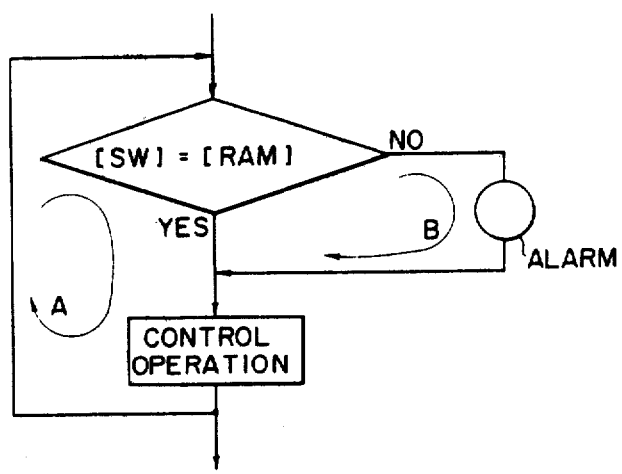
FIG. 2 is a flow chart for explaining the embodiment.

In an ordinary case, the operation carried out by digital operational device 12 is performed through a loop A as shown in FIG. 2. That is, a set value [SW] set by the input setting switch 11 is compared with a memorized value [RAM] in the memory device 13. When the result of the comparison indicates that the set value [SW] is equal to the memorized value [RAM], the operation of the operational device 12 is shifted to the control operation for device 12. For example, a control signal for a protective relaying apparatus may be executed in accordance with the memorized value [RAM] to thus perform a controlled operation of the apparatus. After completion of one complete step of the control operation, the operation of the device 12 for comparing [SW] with [RAM] is repeated.

However, when the result of the comparison indicates inequality, the operation of the device 12 follows a route B thereby operating an alarm.

As is apparent from the above description, the operation of the device 12 is shifted between the comparison and the control operation in a cyclic manner, and a periodic supervision of the set value is thereby achieved. It is also apparent that the above described two operations and the cyclic shifting between the two operations are performed under the control of a well known central processing unit CPU in the digital operational device 12.

Although the comparison operation and the control operation have been described as being performed by the digital operational device 12, it is apparent that the operation of the device 12 is not necessarily limited to the aforementioned two operations, but if required, any other operation may also be added to the two operations.

By the above described example of the input setting method, an input value set by the setting switch 11 is first memorized in a memory device 13, and the set value and the memorized value are periodically compared to each other. As a result, when a memorized value [RAM] is found erroneous because of an erroneous manipulation of the setting switch 11, a faulty operation of the same, or because of spurious noise and the like, the erroneous [RAM] can be readily detected, thus providing an input setting method for a digital operational device of a high reliability.

Figure 3:
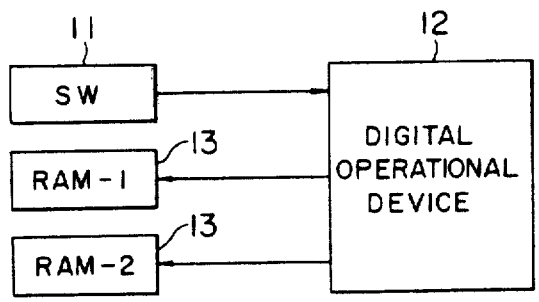
FIG. 3 is a block diagram used for carrying out another embodiment of the invention.

In FIG. 3, there is illustrated another embodiment of the present invention wherein two memorizing devices 13 are provided for storing a value set by the input setting switch 11.

In the flow chart of FIG. 4, showing this embodiment the periodic supervision of the set value is accomplished by comparing three values [SW], [RAM-1], and [RAM-2] with each other. That is, three conditions X, Y, and Z shown in FIG. 5 are periodically checked for determining any erroneous value among the three values [SW], [RAM-1], and [RAM-2].

Where a value [RAM-1] is erroneous, conditions X and Z do not hold, but the condition Y holds. After surveying the three conditions as described above, either one of the two values [SW] and [RAM-2], that is judged to be correct from the holding condition Y, is used in the control operation of the digital operational device 12.

Likewise, when [RAM-2] is found erroneous as a result of the survey of the three conditions X, Y, and Z, either one of two values [SW] and [RAM-1], both judged to be correct from the holding condition X, is used in the following control operation of the device 12.

Similarly, when [SW] is judged to be erroneous from the holding condition Z, either one of the values [RAM-1] and [RAM-2] is used in the control operation.

Where all of the three conditions X, Y, and Z do not hold, a device is provided in the operation device 12 so that it locks the control operation of the same device 12 that is, no new control operation is executed, as illustrated in the flow path 19 shown in FIG. 4. Alternatively, the device provided in the operational device 12 may or allow operational device 12 to carry out the control operation by using the erroneous set value while invalidating the results of the control operation after the completion thereof. When all the conditions X, Y, and Z hold, the operation of the device 12 is carried out simply through the loop A.

According to this embodiment, a value set by the input setting switch 11 and two values memorized in the two memorizing devices are compared with each other, and when two or more of the three values are found correct, the control operation of the digital operational device 12 is carried out by using the correct value. Furthermore, since the correctness of the input value is assured by comparing the three values with each other, the reliability of the embodiment of the invention can be substantially improved. More specifically, even in the case where the data applied by input setting switch 11 becomes erroneous, the correctness of the control operation can be assured by the use of the any one of the memorized values which are found correct. This feature is particularly advantageous when the reliability of the input setting switch is comparatively low.

In still another embodiment wherein three memory devices are provided, the set value is compared successively with the values memorized in the memory devices as shown in FIG. 6. This embodiment is particularly advantageous where the reliability of the memory devices 13 is comparatively low.

In all of the above descriptions, it has been assumed that the number of input setting switches (not of the actual number of the rotary switches) is equal to unity. However, it is apparent that a plurality of input setting switches may also be provided for setting a corresponding number of input values. In this case, the number of the memory devices 13 is also increased in accordance with the number of the input setting switches 11.

In the case where the input setting switch 11 is also used commonly for other purposes, the comparison between the set value and the values memorized in memory devices will be some times impossible. In this case, the set value is memorized in a plurality of memory devices, and the comparison is effected between the memorized values. For instance, in the example shown in FIGS. 4 and 5, the comparisons between [SW] and [RAM-1], and [SW] and [RAM-2] are eliminated, and a comparison between [RAM-1] and [RAM-2] is merely carried out.

We claim:

1. An input setting method for a protective relaying apparatus for an electric power system, said relaying apparatus including an input setting switch for digitally setting data required for a protective relaying operation of said relaying apparatus, a digital operational device connected to receive said data for periodically executing said relaying operation, and a memory device for storing said data, said method comprising the steps of:
    setting said data by utilizing said input setting switch;
    storing the data set by said input setting switch in said memory device;
    comparing the data set by said input setting switch with the data stored in said memory device during time intervals between periodic executions of said relaying operation;
    carrying out said relaying operation utilizing said data when the compared data are found equal; and, issuing an alarm signal when the compared data are found to be unequal.

2. An input setting method for a protective relaying apparatus for an electric power systemm, said relaying apparatus including an input setting switch for digitally setting data required for a protective relaying operation of said relaying apparatus, a digital operational device connected to receive said data for periodically executing said relaying operation, said first and second memory devices for storing said data, said method comprising the steps of:
    setting said data by utilizing said input setting switch;

storing the data set by said input setting switch in said first memory device;

storing the data set by said input setting switch in said second memory device;

comparing the data stored in said first memory device with the data sored i said second memory device;

carrying out said relaying operation utilizing said data stored in either one of said first and second memory devices when the compared data are found equal; and issuing an alarm signal when the compared data are found to be unequal.

3. An input setting method as set forth in claims 1 or 2 which further comprises a step of locking said protective relaying operation in a previous controlled condition when the compared data are found to be unequal.

4. An input setting method for a protective relaying apparatus for an electric power system, said relaying apparatus including an input setting switch for digitally setting data required for a protective relaying operation of said relaying apparatus, a digital operation device connected to receive said data for periodically executing said relaying operation, and first and second memory devices for storing said data, said method comprising the steps of:

setting said data by utilizing said input setting switch;

storing the data set by said input setting switch in said first memory device;

storing the data set by said input setting switch in said second memory device;

comparing the data set by said input setting switch with the data stored in the first memory device;

comparing the data set by said input setting switch with the data stored in the second memory device;

comparing the data stored in said first memory device with the data stored in said second memory device;

carrying out said relaying operation utilizing said data stored in either one of said first and second memory devices when the compared data are found equal; and, issuing an alarm signal when the compared data are found to be unequal.

* * * * *